United States Patent
Akita et al.

(10) Patent No.: US 8,971,427 B2
(45) Date of Patent: Mar. 3, 2015

(54) WIRELESS TRANSCEIVER SYSTEM AND METHOD

(75) Inventors: Koji Akita, Yokohama (JP); Takahiro Sekiguchi, Yokohama (JP); Toshiyuki Nakanishi, Yokohama (JP)

(73) Assignees: Kabushiki Kaisha Toshiba, Tokyo (JP); Toshiba Medical Systems Corporation, Tochigi (JP)

(*) Notice: Subject to any disclaimer, the term of this patent is extended or adjusted under 35 U.S.C. 154(b) by 0 days.

(21) Appl. No.: 13/553,047

(22) Filed: Jul. 19, 2012

(65) Prior Publication Data

US 2012/0321006 A1 Dec. 20, 2012

Related U.S. Application Data

(63) Continuation of application No. PCT/JP2010/050835, filed on Jan. 22, 2010.

(51) Int. Cl.
*H04L 27/28* (2006.01)
*H04L 27/26* (2006.01)

(52) U.S. Cl.
CPC ........ *H04L 27/2657* (2013.01); *H04L 27/2671* (2013.01); *H04L 27/2675* (2013.01)
USPC .......................................... 375/260; 375/376

(58) Field of Classification Search
CPC ............ H04L 27/2655; H04L 27/2657; H04L 27/2671; H04L 27/2675
USPC ........................... 375/260, 355, 371, 373, 376
See application file for complete search history.

(56) References Cited

U.S. PATENT DOCUMENTS

| | | | | |
|---|---|---|---|---|
| 6,091,702 | A * | 7/2000 | Saiki | 370/203 |
| 6,975,570 | B1 * | 12/2005 | Gushima et al. | 369/47.31 |
| 6,993,094 | B1 | 1/2006 | Eberlein et al. | |
| 7,961,821 | B2 * | 6/2011 | Habuka et al. | 375/345 |
| 8,259,605 | B2 * | 9/2012 | Moss et al. | 370/252 |
| 2006/0240798 | A1 * | 10/2006 | Jarosinski et al. | 455/343.1 |
| 2008/0247494 | A1 * | 10/2008 | Halford et al. | 375/343 |
| 2009/0046790 | A1 * | 2/2009 | Soliman | 375/260 |

(Continued)

FOREIGN PATENT DOCUMENTS

| CN | 1292963 | 4/2001 |
|---|---|---|
| CN | 101610114 | 12/2009 |

(Continued)

OTHER PUBLICATIONS

English-language translation of International Preliminary Report on Patentability for PCT/JP2010/050835.

(Continued)

*Primary Examiner* — David B. Lugo
(74) *Attorney, Agent, or Firm* — Nixon & Vanderhye, P.C.

(57) ABSTRACT

According to one embodiment, a wireless transceiver system includes a transmitter and a receiver. The transmitter includes a first generator, a second generator, a third generator. The second generator generates fixed data item that has bit values corresponding to the clock signal. The third generator performs OFDM modulation for the fixed data item. The receiver includes a first detector, a second detector, a PLL, a controller. The first detector is configured to detect an envelope that indicates amplitude in a time waveform. The controller is configured to control to operate the PLL from a first time point when the head part is detected to a second time point when a first period is elapsed.

18 Claims, 8 Drawing Sheets

(56) References Cited

U.S. PATENT DOCUMENTS

2009/0317092 A1   12/2009  Nakashima et al.
2010/0117649 A1*  5/2010  Nakanishi et al. ............ 324/318

FOREIGN PATENT DOCUMENTS

| | | |
|---|---|---|
| JP | 7-30513 | 1/1995 |
| JP | 7-283807 | 10/1995 |
| JP | 8-265292 | 10/1996 |
| JP | 10-51419 | 2/1998 |
| JP | 11-163825 | 6/1999 |
| JP | 2001-186200 | 7/2001 |
| JP | 2003-46494 | 2/2003 |
| JP | 2003-188931 | 7/2003 |

OTHER PUBLICATIONS

International Search Report for PCT/JP2010/050835, mailed Feb. 16, 2010.

P.H. Moose, "A Technique for Orthogonal Frequency Division Multiplexing Frequency Offset Correction", *IEEE Transactions on Communications*, vol. 42, No. 10, Oct. 1994, pp. 2908-2914.

Sekiguchi et al., "Development of Digital Wireless Transceiver for a MRI Coil with Clock Synchronization", Proc. Intl. Soc. Mag. Reson. Med. 17 (2009), p. 3048.

Office Action mailed Jul. 2, 2014 in counterpart Chines Patent Application No. 201080061913.4 and English-language translation thereof.

* cited by examiner

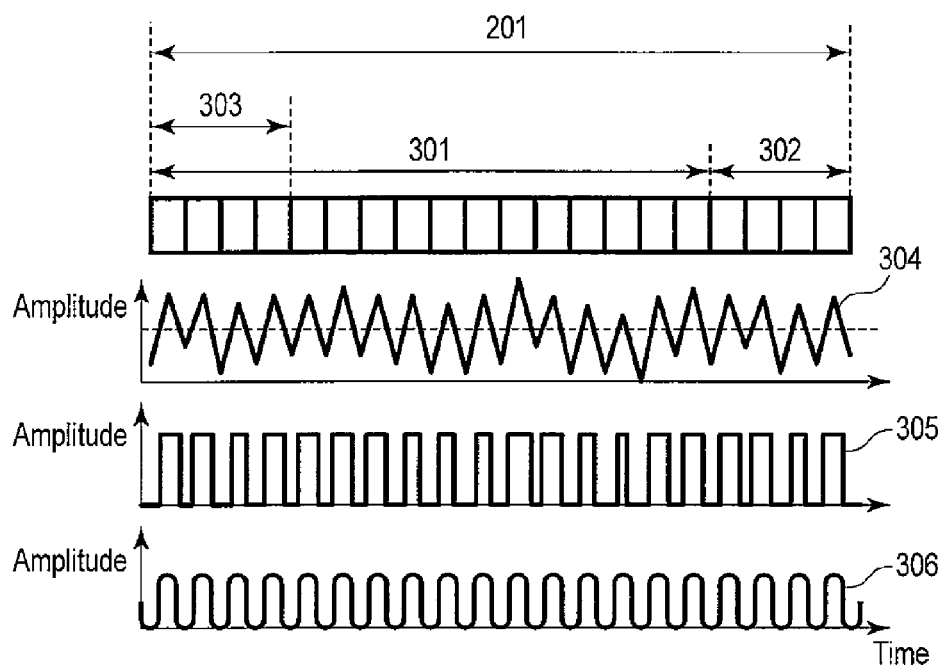
F I G. 3
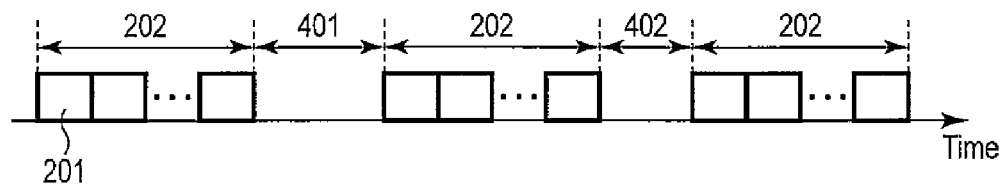
F I G. 4

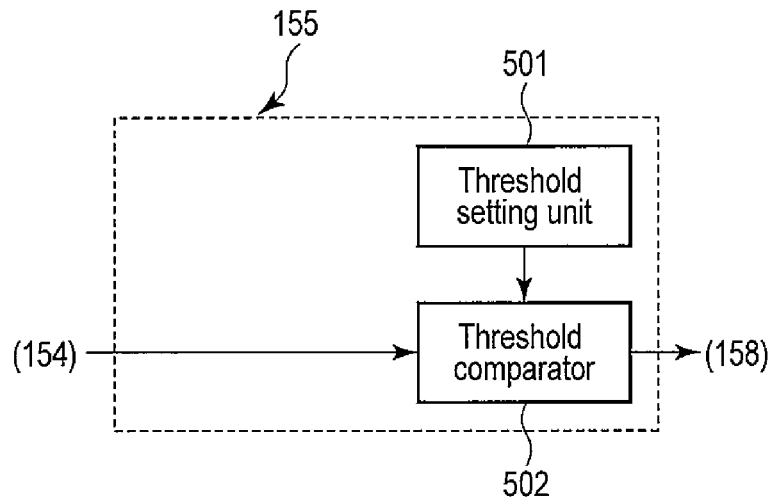
F I G. 5
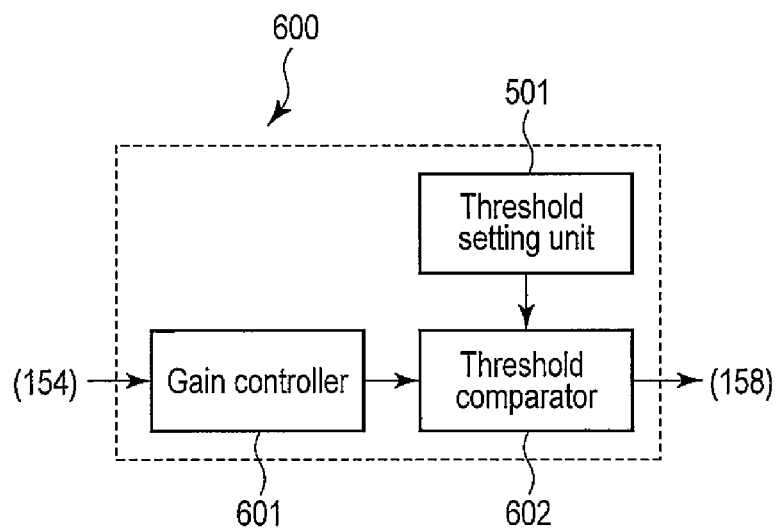
F I G. 6

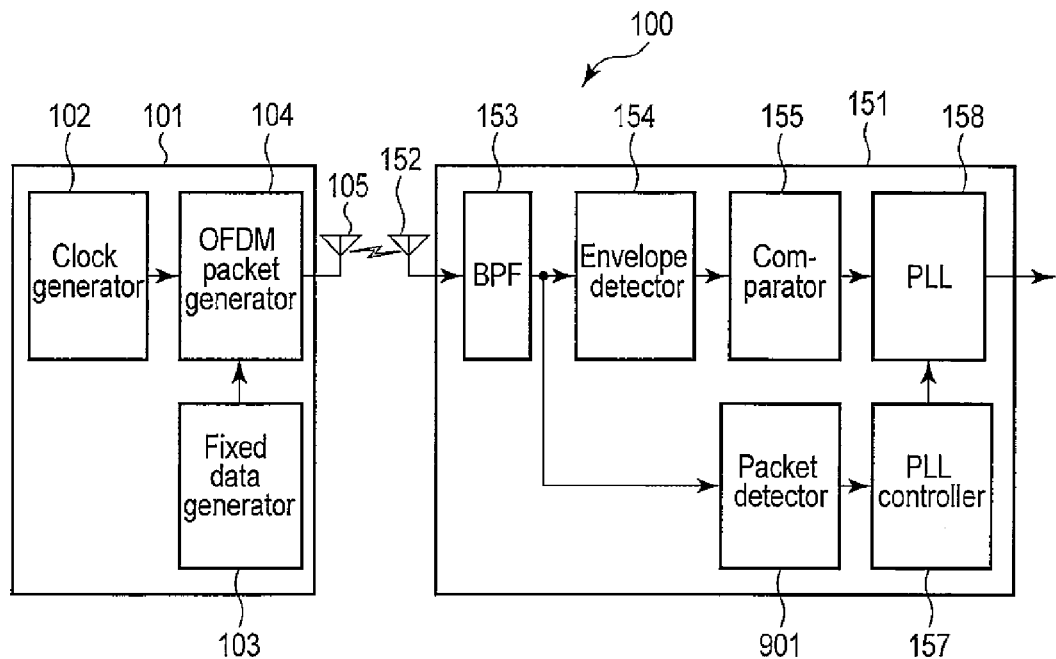
F I G. 9
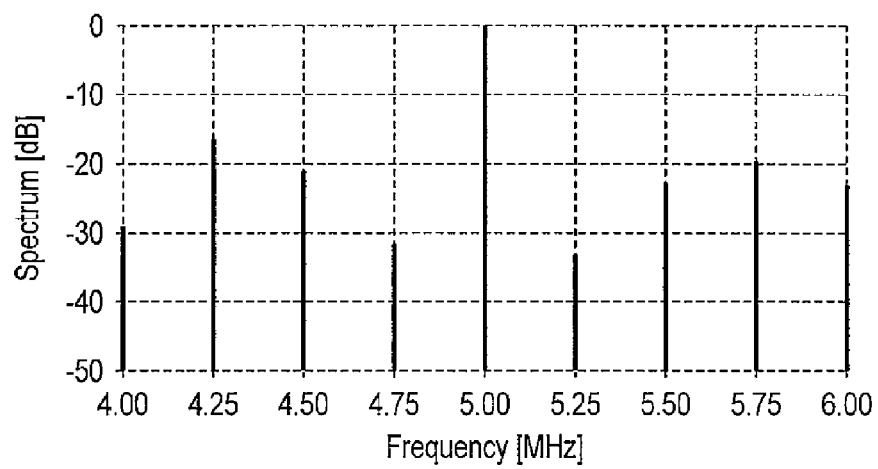
F I G. 10

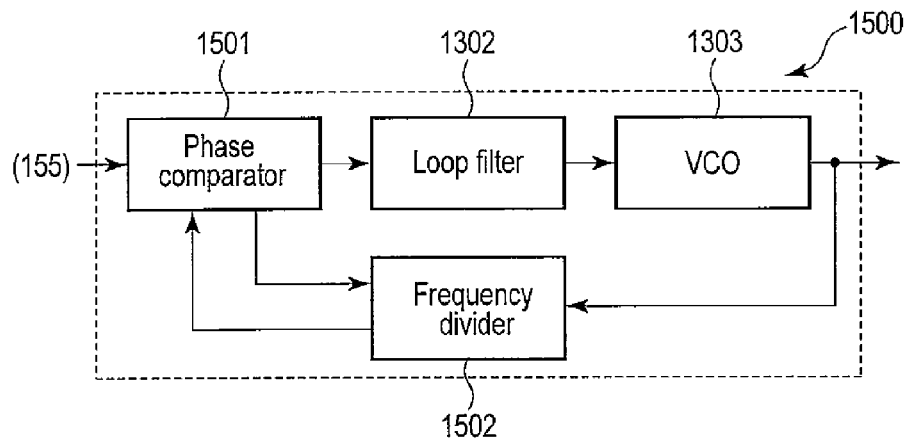
F I G. 15
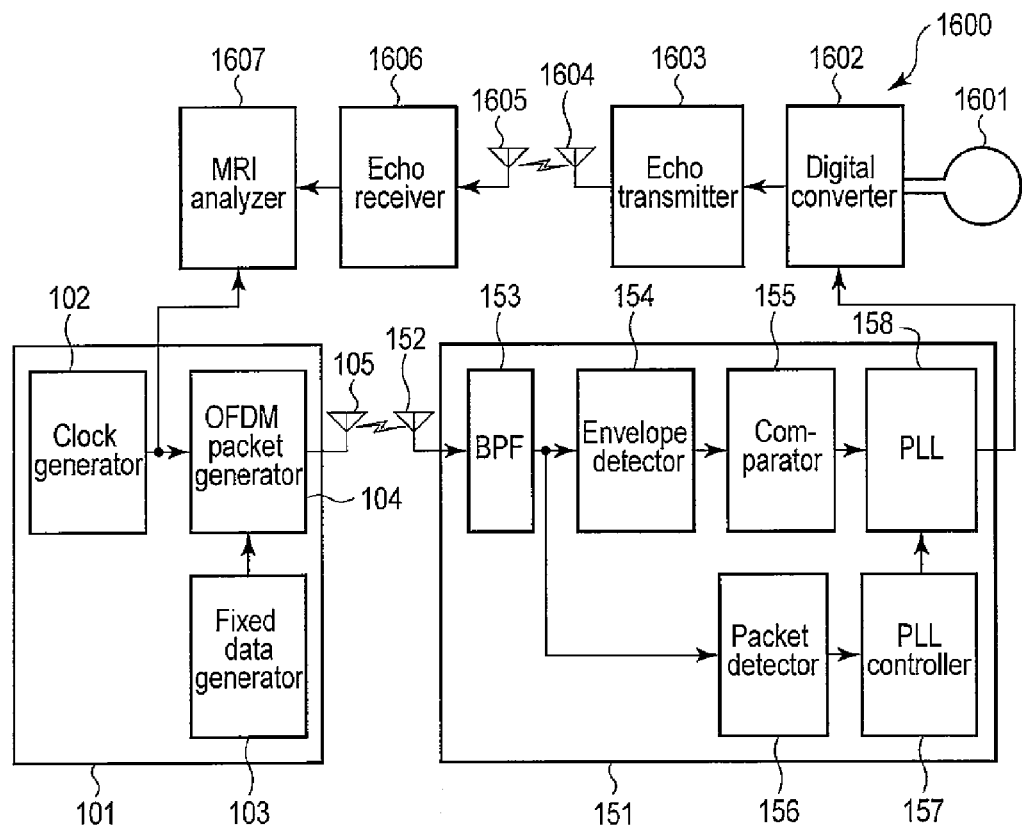
F I G. 16

WIRELESS TRANSCEIVER SYSTEM AND METHOD

CROSS REFERENCE TO RELATED APPLICATIONS

This application is a Continuation Application of PCT Application No. PCT/JP2010/050835, filed Jan. 22, 2010, the entire contents of which are incorporated herein by reference.

FIELD

Embodiments described herein relate generally to a wireless transceiver system and method.

BACKGROUND

Methods of synchronizing frequencies by performing correlation operation using a repetitive waveform of an orthogonal frequency division multiplexing (OFDM) packet are known (See, e.g., T. Sekiguchi, et al., "Development of Digital Wireless Transceiver for a MRI Coil with Clock Synchronization", ISMRM 2009, and, P. H. Moose, "A technique for orthogonal frequency division multiplexing frequency offset correction," IEEE Trans. Commun., Vol. 42, No. 10, pp. 2908-2914, October 1994). For example, in IEEE 802.11a being a wireless local area network (LAN) standard, a preamble which includes a repetitive waveform is allocated at the head of a packet. When the frequency used in a transmitter is completely the same as the frequency used in a receiver, the repetitive form is observed in the receiver. On the other hand, when the frequency used in the transmitter is shifted from the frequency used in the receiver, the receiver detects a phase difference which is proportional to the difference in the frequency. Therefore, it is possible to synchronize the frequencies of the transmitter and the receiver, by detecting a phase difference and performing correlation operation of a repetitive waveform.

BRIEF DESCRIPTION OF THE DRAWINGS

FIG. 3 is a diagram illustrating relationship between an OFDM symbol and an envelope.

FIG. 4 is a diagram illustrating transmission intervals of OFDM packets.

FIG. 5 is a block diagram illustrating a comparator.

FIG. 6 is a block diagram illustrating a first modification of the comparator.

FIG. 9 is a block diagram illustrating a modification of a packet detector.

FIG. 10 is a diagram illustrating an example of spectrum around a desired frequency.

FIG. 15 is a block diagram illustrating a second modification of the PLL.

FIG. 16 is a block diagram illustrating an MRI apparatus according to a second embodiment.

DETAILED DESCRIPTION

In the case where there is a frequency offset in which a phase of a repetitive waveform is rotated by 360° or more, however, it is impossible to detect an accurate frequency offset. Therefore, it is necessary that the frequency used in the transmitter agrees with the frequency used in the receiver with a certain degree of accuracy, and it is necessary to provide each of the transmitter and the receiver with a sender which has a certain degree of accuracy.

In general, according to one embodiment, a wireless transceiver system includes a transmitter and a receiver. The transmitter includes a first generator, a second generator, a third generator. The first generator is configured to generate a clock The second generator is configured to generate fixed data item that has bit values corresponding to the clock signal. The third generator is configured to perform orthogonal frequency division multiplexing (OFDM) modulation for the fixed data item to generate an OFDM packet. The receiver includes a first detector, a second detector, a phase-locked loop (PLL), a controller. The first detector is configured to detect an envelope that indicates amplitude in a time waveform of the OFDM packet to obtain an envelope signal. The comparator is configured to compare the envelope signal with a first threshold to generate a square wave signal. The second detector is configured to detect a head part of the OFDM packet. The PLL is configured to extract a synchronized clock signal from a main frequency component of the square wave signal, the synchronized clock signal being a signal synchronized with the clock signal. The controller is configured to control to operate the PLL from a first time point when the head part is detected to a second time point when a first period is elapsed, the first period being a period that receiving of at least one OFDM packet has finished.

A wireless transceiver system and method according to embodiments of the present invention will be explained hereinafter with reference to drawings. In the following embodiments, constituent elements which are denoted by the same reference number perform the same operation, and overlapping explanation thereof will be omitted.

(First Embodiment)

Figure 1:
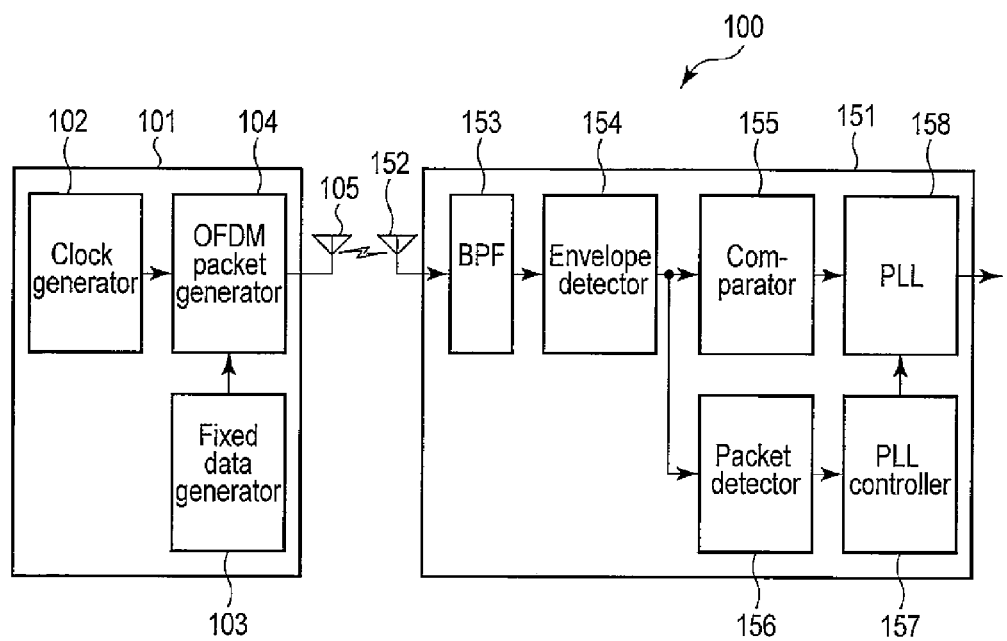
FIG. 1 is a block diagram illustrating a wireless transceiver system according to a first embodiment.

An example of using a wireless transceiver system according to the present embodiment will be explained hereinafter with reference to FIG. 1.

A wireless transceiver system 100 according to the present embodiment comprises a transmitter 101 and a receiver 151. The transmitter 101 includes a clock generator 102, a fixed data item generator 103, an OFDM packet generator 104, and an antenna 105. The receiver 151 includes an antenna 152, a bandpass filter (BPF) 153, an envelope detector 154, a comparator 155, a packet detector 156, a PLL controller 157, and a PLL 158.

The clock generator 102 generates a clock signal.

The fixed data item generator 103 generates desired fixed data item. The fixed data item can be formed of, for example, a specific bit string. A period in which amplitude in a time region of an OFDM packet described below is changed in accordance with the value (hereinafter referred to as the "bit value") of a bit string of the fixed data item. In other words, a distribution of frequency components can be uniquely fixed by controlling the bit value of the fixed data item. Specifically, since the bit value of the fixed data item changes in accordance with the clock signal, the clock signal can be placed on an envelope of an OFDM packet, by changing the bit value in accordance with the increase/decrease cycles of the envelope of the OFDM packet, or changing the bit value in accordance with the frequency to be synchronized. Operation of the fixed data item generator 103 will be explained later with reference to FIG. 2, FIG. 3, and FIG. 4.

The OFDM packet generator 104 receives the clock signal from the clock generator 102, receives fixed data item from the fixed data item generator 103, and thereby generates an OFDM packet.

The antenna 105 receives the OFDM packet from the OFDM packet generator 104, and transmits the OFDM packet to the receiver 151.

The antenna 152 receives the OFDM packet from the transmitter 101, and transmits the OFDM packet to the BPF 153.

The BPF 153 receives the OFDM packet from the antenna 152, and limits the band of the OFDM packet to extract only a predetermined bandwidth.

The envelope detector 154 receives the band-limited OFDM packet from the BPF 153, and generates an envelope signal by performing envelope detection. The envelope detection is performed by detecting increase and decrease in the amplitude of the time waveform of the OFDM packet. In addition, the envelope increases and decreases in synchronization with the clock signal supplied from the clock generator 102. Therefore, the envelope of the OFDM packet transmitted from the transmitter 101 includes a frequency component which has a cycle that is n (n is an integer) times as long as the cycle of the clock signal.

The comparator 155 receives the envelope signal from the envelope detector 154, and generates a square-wave signal by comparing the envelope signal.

Operation of the comparator 155 will be explained later with reference to FIG. 5, FIG. 6, FIG. 7, and FIG. 8.

The packet detector 15 receives the envelope signal from the envelope detector 154, detects the head of the OFDM packet, and generates a detection signal.

The PLL controller 157 receives the detection signal from the packet detector 156, and generates a control signal to control to operate the PLL 158 described later for a certain period. Operation of the PLL controller 157 will be explained later with reference to FIG. 11 and FIG. 12.

The PLL 158 receives the square-wave signal from the comparator 155, and receives the control signal from the PLL controller 157. Then, the PLL 158 removes unnecessary frequency components from the square signal, and extracts only a specific frequency component in the period of the OFDM packets determined by the control signal, and reproduces a synchronized clock signal which is synchronized with the frequency (hereinafter also referred to as the "clock frequency") of the clock signal transmitted from the transmitter 101.

The state "synchronization of frequencies" is not limited to the state where frequencies completely agree with each other, but may be the state where the frequency is close to the clock frequency. Specifically, supposing that the clock frequency which is supplied from the clock generator is f_tx, and the synchronized clock frequency reproduced by the receiver 151 is f_rx, it suffices that f_tx is sufficiently close to A×f_rx, which is indicated by a constant A.

The value of A is determined by relation between the clock signal which is generated by the clock generator 102 of the transmitter 101 and the frequency bandwidth of the OFDM packet, and the fixed data item. For example, when the clock frequency generated by the clock generator 102 is 20 MHz and the frequency which is strongly exhibited in the envelope of the OFDM packet generated by desired fixed data item, that is, the main frequency generated by Fourier transform is 5 MHz, the constant A is 4. In such a case, when the clock frequency supplied from the clock generator 102 is 5 MHz, the clock frequency of 5 MHz is multiplied by 4 and input to the OFDM packet generator 104, and thereby the constant A is 1. The constant A is 1, also by multiplying the clock frequency by 4 in the PLL 158.

Next, the method of generating fixed data item by the fixed data item generator 103 will be detailed later with reference to FIG. 2, FIG. 3, and FIG. 4.

First, the OFDM packet will be explained hereinafter with reference to FIG. 2.

An OFDM packet 202 includes a plurality of OFDM symbols 201 which is formed of a signal generated by fast Fourier transformation (FFT). In FIG. 2, each block indicates the OFDM symbol 201. A head period of the OFDM packet 202 is referred to as header 203. The header 203 includes a known signal other than data, such as a pilot signal. The rest period of the OFDM packet 202, which follows the header 203, is referred to as data 204. Therefore, in the OFDM packet 202 which is transmitted from the transmitter 101 according to the present embodiment, the period in which the envelope can be changed by the fixed data item is the period of the data 204.

Figure 2:
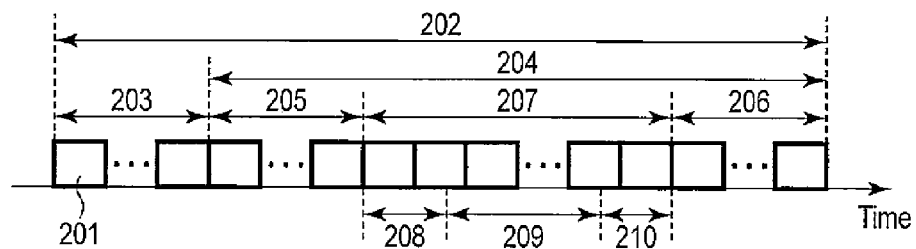
FIG. 2 is a diagram illustrating an example of an OFDM packet.

However, there are cases where information other than the data main body, such as transmission destination information of the OFDM packet, is inserted in a part (period 205) of the head in the OFDM symbols 201 in the data 204 illustrated in FIG. 2. In such a case, the envelope cannot be changed by the fixed data item for the period 205 in which these information items are inserted, and no specific frequency may not be expressed in the envelope. In the same manner, there are cases where information other than the data main body, such as a tail bit that is generated by encoding and a zero-padding bit to agree the data length with the packet length, is added to the last part (period 206) in the OFDM symbols 201 of the data 204. Also in such a case, the envelope cannot be changed by the fixed data item for the period 206 to which these information items are added.

Therefore, when the data 204 includes transmission destination information and a zero-padding bit, a period 207 is a period in which the envelope can be substantially changed by the fixed data item, in the OFDM symbols 201 of the data 204.

Next, the OFDM symbol 201 will be explained hereinafter with reference to FIG. 3.

A cyclic prefix 302 which is obtained by repeating part of the waveform is added to the OFDM symbol 201. As illustrated in FIG. 3, the period 301 is a part which is generated by FFT, and the cyclic prefix 302 is a part which is obtained by repeating the period 303. The period 301 and the cyclic prefix 302 which are united together are referred to as OFDM symbol 201. A waveform 304 indicates a time waveform of the OFDM packet, which is generated by the OFDM packet generator 104 and formed on the clock. A waveform 305 indicates a time waveform of a square wave signal which is extracted by the comparator 155 from the envelope signal detected by the envelope detector 154 for the signal 304. A waveform 306 is a time waveform of the synchronized clock signal which is extracted by the PLL 158 from the square wave signal.

When the length of the OFDM symbol is T_S, the cycle of the frequency which the envelope of the OFDM packet can have is 1/n (n is an integer) as long as T_S. In addition, since the cyclic prefix is a waveform obtained by repeating part of the OFDM symbol waveform, when the cyclic prefix length is T_C, it is required that the cycle of the envelope is 1/n as long as T_C, to provide the envelope with a certain cycle through the whole OFDM symbol. As described above, when the cycle of the envelope of the OFDM packet is T_ENV, it is possible to strongly exhibit a frequency component of 1/T_ENV as the frequency of the envelope, by selecting fixed data item such that T_ENV is 1/n as long as T_S and 1/n as long as T_C.

Specifically, in the example of IEEE 802.11a standard, T_S is 3.2 μs and T_C is 0.8 μs, and thus it is necessary to calculate a reciprocal of a common divisor of T_S and T_C, to make T_ENV to be 1/n as long as T_S and 1/n as long as T_C. However, a common divisor of two positive real numbers X and Y indicates a real number Z for which positive integers a and b that satisfy X=a×Z and Y=b×Z exist. 0.8, 0.4, 0.2, and 0.1 μs are obtained as common divisors of T_S and T_C. Therefore, the fixed data item generator 103 selects fixed data item such that the envelope of the OFDM symbol increases and decreases at cycles of 0.8 or 0.4 μs.

It is possible to enhance synchronization accuracy of frequencies by receiving a plurality of OFDM packets, and not performing synchronization in a period in which no OFDM packets are transmitted, in consideration of the transmission cycles of OFDM packets. In this case, it is necessary to consider the transmission intervals of OFDM packets when the cycle of the envelope is set. An example of transmission intervals of OFDM packets will be explained hereinafter with reference to FIG. 4.

As illustrated in FIG. 4, a plurality of OFDM packets 202 are successively transmitted, with non-signal periods 401 and 402 interposed. According to the transmission intervals of OFDM packets, phases of envelopes of the former OFDM packets and following OFDM packets do not agree with each other. The PLL 158 included in the receiver 151 causes the frequencies to agree with each other, by comparing the phases and synchronizing the frequencies. Therefore, when the frequencies of the former OFDM packets and the following OFDM packets are compared with each other, there are cases where the PLL 158 detects a phase difference, when their phases do not agree with each other even when their frequencies agree with each other. By detecting a phase difference in the PLL 158, the receiver 151 erroneously determines that the frequency of the former OFDM packets is different from the frequency of the following OFDM packets, and the frequency synchronization accuracy may be more deteriorated by attempting to synchronize the frequencies using a plurality of OFDM packets.

Therefore, to make the phases uniform between OFDM packets 202 when frequencies are synchronized by using OFDM packets 202, the fixed data item is selected such that the cycle T_ENV is 1/n as long as T_S, T_C and T_I, when the transmission intervals of the OFDM packets 202 is n times as large as T_I.

Specifically, in the example of IEEE 802.11a, T_S is 3.2 μs, T_C is 0.8 μs, and transmission intervals of OFDM packets is n times as long as 1 μs, for example, T_I is 1 μs. The fixed data item generator 103 calculates a common divisor of T_S, T_C, and T_I, and selects fixed data item such that the envelope increases and decreases at cycles of the calculated common divisor (such as 0.2 and 0.1 μs), and thereby the clock signal can be placed on OFDM packets without shift. Specifically, the phases of the envelopes of OFDM packets can be made agree with each other, and it is possible to synchronize the frequencies by effectively using a plurality of OFDM packets with higher accuracy than the case of synchronizing the frequencies by using one OFDM packet.

Since the signal of IEEE 802.11a is an OFDM packet generated by a sample frequency of 20 MHz, however, it is impossible to change the envelope at cycles of 0.05 μs or less, which is the cycle of the sample frequency. Therefore, although it is desirable to use the cycles of 0.2 or 0.1 μs to synchronize frequencies and phases in the IEEE 802.11a, the phases can be made agree with each other even in a state of using large cycles, by using a method described later with reference to FIG. 7.

When the frequencies are synchronized by using a plurality of OFDM packets, it is desirable that the rate of periods in which OFDM packets are transmitted is larger than the rate of periods in which no OFDM packets are transmitted, as a method of transmitting OFDM packets. This is because the frequency synchronization accuracy is increases by increasing the rate of time in which the frequencies are synchronized in the receiver 151.

However, the transmitter 101 which is compliant with the IEEE 802.11a standard cannot successively transmit OFDM packets without transmission intervals, and is required to transmit OFDM packets with predetermined time intervals. Therefore, the time in which OFDM packets are transmitted can be increased by increasing the length of one packet. The maximum value of the data length per packet is determined in IEEE 802.11a, however, and thus it is necessary to lower the data rate as well as increasing the data length, to increase the packet length per packet. The data rate can be lowered by, for example, decreasing the coded rate, or performing modulation with low modulation level (using 16 quadrature amplitude modulation (QAM), not 64 QAM).

As another example of the method of generating the fixed data item, the fixed data item generator 103 generates a plurality of data patterns such that the OFDM packets have the above cycles, the OFDM packet generator 104 receives the data patterns and generates a plurality of OFDM packets, and fixed data item is obtained by selecting an envelope in which power of a specific frequency component is strongly exhibited when the receiver 151 receives the packets. Each data pattern is indicated by a desired bit string.

In the above operation, a data pattern for the whole OFDM packet may be used, or a data pattern which corresponds to an OFDM symbol may be used. In the case of using a data pattern for an OFDM symbol, a pattern obtained by repeating the selected data pattern a plurality of times is used as a data pattern for the whole OFDM packet.

As processing which is necessary for generating a waveform for an OFDM symbol from a data pattern, there are modulation processing of assigning the bit strings to modulated symbols on an IQ plane, subcarrier assignment processing of assigning them to OFDM subcarriers, and FFT processing of transforming them into a time-base signal. Specifically, a plurality of data patterns are generated by the fixed data item generator 103, and an OFDM symbol is generated by subjecting the data patterns to modulation, subcarrier assignment, and FFT. The generated OFDM symbol is transmitted to the receiver 151. The receiver evaluates an envelope of a waveform which is generated by the envelope detector 154, and synchronizes the frequencies.

On the other hand, in a radio apparatus which is compliant with the standard such as IEEE 802.11a, there are scramble processing of scrambling the bit value, interleave processing of rearranging bits in certain blocks, and encoding processing of adding redundancy to the bit string and converting the bit string into longer bit string, in addition to the above. Also in the case of performing such processing, an OFDM symbol can be generated by performing necessary processing in the same manner.

However, backward processing exists for transform which is surjection and injection such as scramble processing and interleave processing, and thereby trial of the data patterns is performed without backward processing. Then, backward processing of the performed processing is performed for the data pattern which is selected as a result, thereby the data pattern which is originally to be used is generated, and the data pattern may be selected as fixed data item.

Next, operation of the comparator 155 will be explained in detail with reference to FIG. 5, FIG. 6, FIG. 7, and FIG. 8.

The comparator 155 includes a threshold setting unit 501, and a threshold comparator 502.

The threshold setting unit 501 sets a threshold of the power.

The threshold comparator 502 receives the envelope signal from the envelope detector 154, and the threshold value from the threshold setting unit 501, and compares the envelope signal with the threshold. When the power of the envelope signal is higher than the threshold, the threshold comparator 502 outputs a high signal to the PLL 158. When the power of the envelope signal is lower than the threshold, the threshold comparator 502 outputs a low signal to the PLL 158. For example, the high signal and the low signal may be binary "1" and "0", respectively, as logic values. As another example, the high signal may be high voltage, and the low signal may be a voltage lower than the high signal, as voltage values. As described above, the comparator 155 can generate a square signal by evaluating the power by the threshold.

(First Modification of Comparator)

FIG. 6 illustrates an example of modification of the comparator.

A comparator 600 illustrated in FIG. 6 further includes a gain controller 601, in addition to the elements of the comparator 155 illustrated in FIG. 5.

The gain controller 601 receives the envelope signal from the envelope detector 154, and controls the gain of the signal such that an average power of a certain period becomes a predetermined power. Therefore, also in the case where the received power is changed, it is possible to extract a desired frequency component from the envelope of the received signal with high accuracy.

(Second Modification of Comparator)

Figure 7:
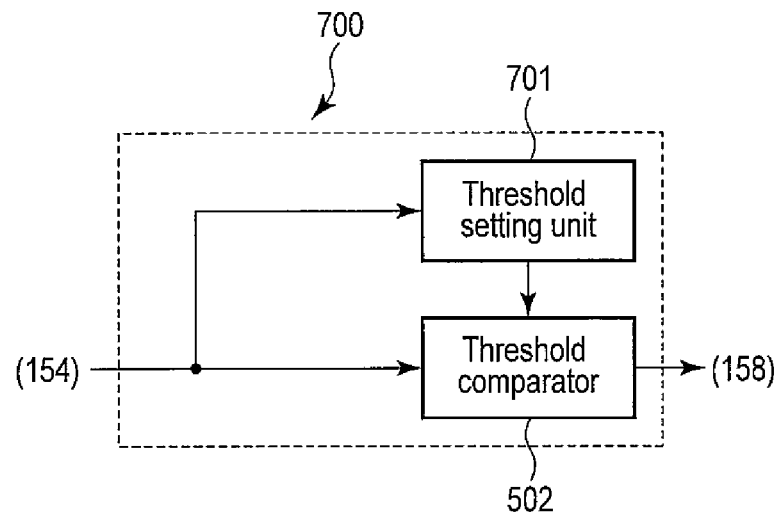
FIG. 7 is a block diagram illustrating a second modification of the comparator.

In addition, the threshold setting unit 501 of the comparator 155 may control the threshold in accordance with the received power. FIG. 7 illustrates a comparator 700 in this case.

A threshold setting unit 701 of the comparator 700 is different from the threshold setting unit 501 of the comparator 155 illustrated in FIG. 5, in that the threshold setting unit 701 receives the envelope signal from the envelope detector 154, and sets the threshold based on the power of the envelope signal. For example, increasing the gain by 3 dB in the gain controller 601 illustrated in FIG. 6 is basically equivalent to decreasing the threshold by 3 dB in the threshold setting unit 701 illustrated in FIG. 7.

In the case of using the comparator 700 illustrated in FIG. 7, the gain controller 601 is unnecessary, and thus the effect of reduction in power consumption can be obtained. On the other hand, in the case of using the comparator 600 illustrated in FIG. 6, the gain for the envelope signal can be controlled in the gain controller 601, and thus there is an advantage of high resistance to noise.

(Third Modification of Comparator)

Figure 8:
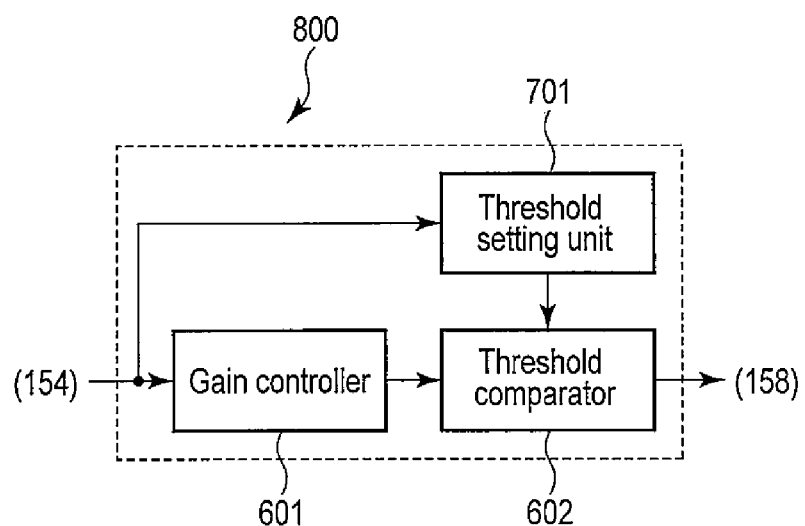
FIG. 8 is a block diagram illustrating a third modification of the comparator.

FIG. 8 illustrates a comparator 800 which is obtained by uniting characteristics of the comparators illustrated in FIG. 6 and FIG. 7.

The gain for the envelope signal may be controlled by the gain controller 601, the threshold may be controlled by the threshold setting unit 701, or both the gain controller 601 and the threshold setting unit 701 may perform well-balanced control. By adopting such a structure, it is possible to enjoy the feature of the comparator 600 illustrated in FIG. 6 and the merit of the comparator 700 illustrated in FIG. 7 with good balance.

When the threshold and/or the gain are controlled in the comparator, it is desirable that the control frequency and the control quantity are limited to a certain value or less. This is because the phase of the signal which is output from the comparator is changed by controlling the threshold and/or gain. Large change in the phase can be prevented while change of the received signal is followed, by limiting the control frequency and the control quantity to a certain value or less, and thus the frequencies can be synchronized with high accuracy even in the case where the received power is changed.

Next, packet detection operation according to the receiver 151 will be explained in detail with reference to FIG. 1 and FIG. 9.

The packet detector 156 of the receiver 151 illustrated in FIG. 1 recognizes a head of the packet (hereinafter also referred to as a head part), when the envelope signal received from the envelope detector 154 is not less than a threshold. Specifically, the packet detector 156 detects that a packet is transmitted, by detecting the signal power of the packet by the envelope signal. In addition, the packet detector 156 may determine the signal power by using the threshold, after subjecting the envelope signal to low-pass filter (LPF) processing (not shown). By adopting such a structure, the envelope which increases and decreases in the OFDM packet is smoothed, and the head of the packet can be detected more stably.

When the packet head is provided with a header which includes a known pattern, packet detection may be performed by a matched filter (MF) (not shown). The ME calculates correlation between the known pattern and the received signal, and determines that the known pattern is received, that is, the packet head is detected when a calculation result is not less than a threshold. When an MF is used like this, the envelope signal may be used as illustrated in FIG. 1, or a band-limited received signal before envelope detection may be used as illustrated in FIG. 9.

A packet detector 901 illustrated in FIG. 9 receives the band-limited received signal before envelope detection from the BPF 153, and performs packet detection. Thereby, although packet detection can be performed with higher accuracy, frequency conversion and analog-to-digital conversion (ADC) are required before the MF is performed. The method of using the envelope signal may be used together with the method of using the MF.

On the other hand, even when the packet detector 156 detects the packet head by using the above methods, the envelope signal may not include a desired frequency component, when the detected OFDM packet is not generated by modulating the fixed data item. In such a case, when the PLL 158 is operated by using an OFDM packet which is not generated by modulating the fixed data item, the frequency synchronization accuracy may deteriorate. Therefore, OFDM packets other than OFDM packets generated by modulating the fixed data item are not used for frequency synchronization, but are discarded, and the PLL 158 is not operated. OFDM packets which are not generated by modulating the fixed data item are, for example, OFDM packets which include variable data such as sound data and image data.

It is determined whether or not the detected OFDM packet is generated by modulating the fixed data item, by including the envelope signal generated by the fixed data item in advance in the packet detector 156 of the receiver 151, correlating the envelope signal with a part of the detected OFDM packet which corresponds to the envelope signal, and determining whether or not the correlation value is not less than the threshold. The corresponding part is, for example, the period 207 illustrated in FIG. 2. When it is determined that the envelope signal of the detected OFDM packet is an OFDM packet generated by modulating the fixed data item, the packet detector 156 transmits the fixed data item detection signal to the PLL controller 157, and operates the PLL 158. The period for which correlation is performed for effectively using the detected fixed data item is preferably a part around the head of the period 207 illustrated in FIG. 2.

As another method, it is also possible to determine whether or not the OFDM packet is an OFDM packet generated by modulating the fixed data item, by detecting the transmission destination information which is included in part of the data of the OFDM packet. Specifically, the packet detector 156 detects the transmission detection information, and determines that the OFDM packet is an OFDM packet generated by modulating the fixed data item, when the destination is the user oneself.

In addition, the packet detector 156 may output an error signal when the frequency of detecting packets becomes a fixed value or less. As described above, when the frequencies are synchronized by using a plurality of OFDM packets, the frequency synchronization accuracy increases as the rate of time in which OFDM packets are transmitted increases, and thus the frequency synchronization accuracy decreases when the frequency of transmitting OFDM packets. Therefore, the packet detector 156 may notify decrease in frequency synchronization accuracy, by outputting an error signal to the exterior when the frequency of detecting packets becomes a threshold or less.

Next, operation of the PLL controller 157 will be explained in detail with reference to FIG. 2, FIG. 10, FIG. 11, and FIG. 12.

The control signal which is generated by the PLL controller 157 basically operates the PLL 158 in the period 207 of the OFDM packet illustrated in FIG. 2, and stops the PLL 158 in the other periods.

To switch the PLL 158 between the operated state and the stopped state in accordance with the period 207 illustrated in FIG. 2, it is desired to accurately detect the head of the OFDM packet by the packet detector 156. This is because the PLL 158 is operated in part of the period 205 or part of the period 206 illustrated in FIG. 2 and the frequency synchronization accuracy may deteriorate, when the head timing of the OFDM packet detected by the packet detector 156 is shifted from the actual timing. Therefore, in this case, when there is some error in detection of the head of the OFDM packet by the packet detector 156, the PLL controller 157 should generate a control signal which slightly delays the timing of operating the PLL 158, or slightly advance the timing of stopping the PLL 158, in consideration of the error.

Specifically, in the example illustrated in FIG. 2, the PLL controller 157 should generate a control signal to delay the timing of operating the PLL 158 by the period 208 from the point of time when the head of the OFDM packet is detected, to advance the period of stopping the PLL 158 by the period 210, and consequently operate the PLL 158 only for the period 209. By setting the operation timing of the PLL 158 as described above, it is possible to operate the PLL 158 during a period of part in which the envelope can be properly controlled, and thus synchronize the frequencies with higher accuracy.

In the case where the envelope generated by the fixed data item has the same waveform for each OFDM symbol, the period in which the PLL is to be operated, for example, the period 209 illustrated in FIG. 2 is desirably n times as long as the length of the OFDM symbol. This is because a strain component other than a desired frequency included in the envelope is divided among frequencies calculated by reciprocals of the OFDM symbol length, and can be easily separated in the PLL 158.

The spectrum when the OFDM symbol length on which the fixed data item is placed is n times as long as the OFDM symbol length will be explained hereinafter with reference to FIG. 10.

FIG. 10 illustrates a distribution of frequency components, that is, spectrum, which is obtained when the OFDM packet is generated by using fixed data item that increases and decreases the envelope of a signal of IEEE 802.11a at cycles of 0.2 µs, and the part of the OFDM packet which corresponds to the period 209 is observed for a period that is n times as long as an OFDM symbol. As illustrated in FIG. 10, strong power is exhibited in 5 MHz which is a frequency generated at cycles of 0.2 µs, and other unnecessary signals are generated at intervals of 0.25 MHz which is a frequency calculated by a reciprocal of 4 µs being the OFDM symbol length. As described above, unnecessary signals are separated from the desired frequency, and it is possible to obtain a state in which only a signal which includes a desired frequency component can be easily extracted.

In addition, to set the period 209 in the fixed data item in which the PLL 158 is operated to be n times as long as the OFDM symbol, the sample number may be counted by using the synchronized clock signal which is output from the PLL 158.

Figure 11:
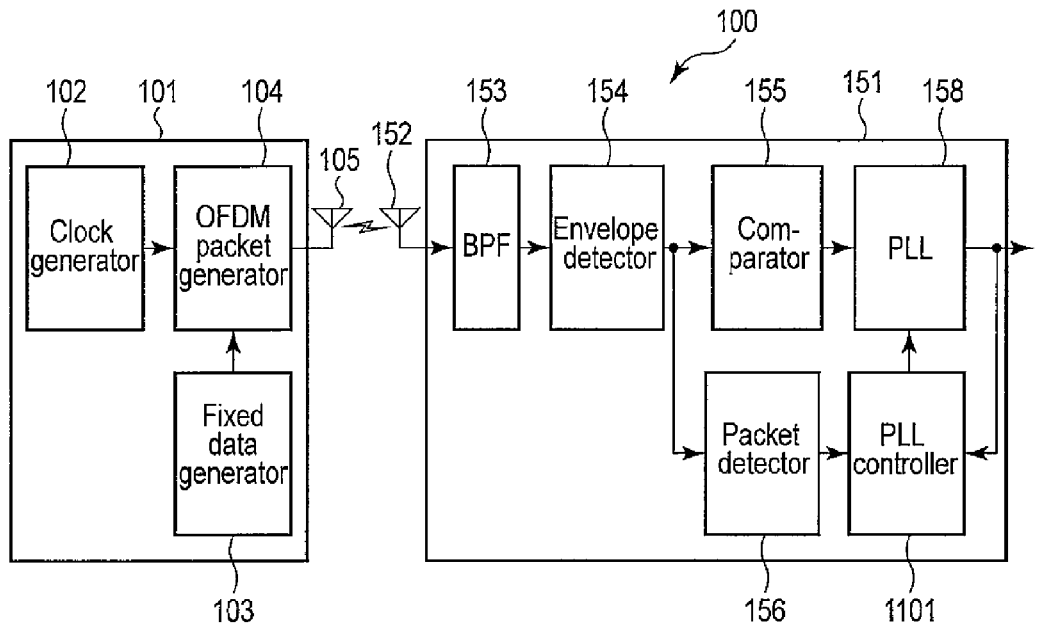
FIG. 11 is a block diagram illustrating a first modification of a phase-locked loop (PLL) controller.

Operation of the PLL controller 157 will be explained hereinafter with reference to block diagrams of FIG. 11 and FIG. 12. The block diagram of FIG. 11 illustrates a first modification of the PLL controller 157, which corresponds to the block diagram of the PLL controller 157 illustrated in FIG. 1. The block diagram of FIG. 12 illustrates a second modification of the PLL controller 157, which corresponds to the block diagram of the PLL controller 157 illustrated in FIG. 9.

Figure 12:
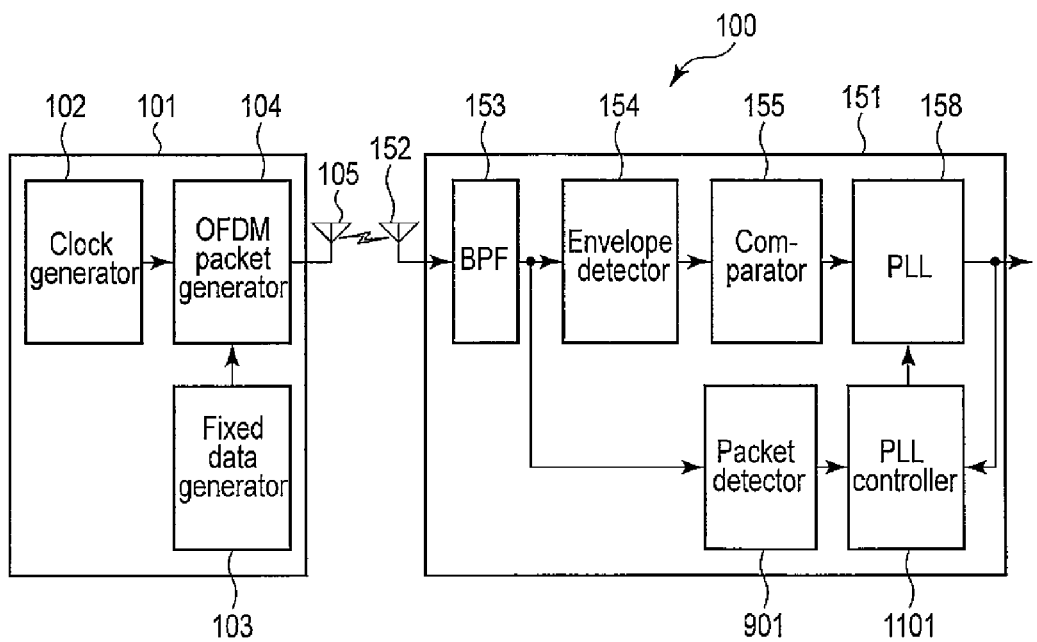
FIG. 12 is a block diagram illustrating a second modification of the PLL controller.

A PLL controller 1101 illustrated in FIG. 11 and FIG. 12 receives the synchronized clock signal from the PLL 158, and measures time for the OFDM symbol length by using the synchronized clock signal. Specifically, when the envelope is increased and decreased at cycles of 0.2 µs and frequency multiplication/division unit 1304 is not used in the PLL 158 described later, the frequency of the synchronized clock signal which is output from the PLL 158 is 5 MHz. Therefore, since 4 µs which is the OFDM symbol length counts 20 for the clock of 5 MHz, the period 209 can be set to be n times as long as the OFDM symbol length, by measuring the time to be n times as long as 20 counts.

Figure 13:
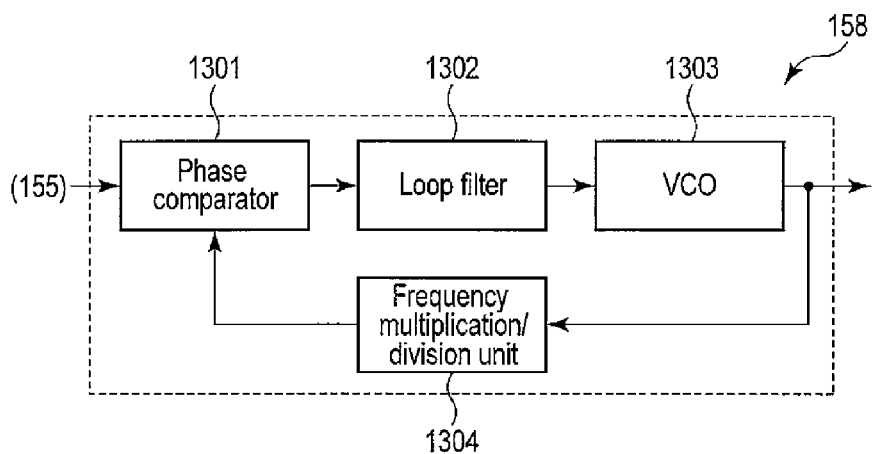
FIG. 13 is a block diagram illustrating a PLL.

Next, the PLL 158 will be explained in detail with reference to FIG. 13.

The ELL 158 includes a phase comparator 1301, a loop filter 1302, a voltage-controlled oscillator (VCO) 1303, and a frequency multiplication/division unit 1304.

The phase comparator 1301 receives a clock signal which is indicated by the square wave signal from the comparator 155, receives a new synchronized clock signal from the frequency multiplication/division unit 1304, and detects a phase difference between the two clock signals. Then, the phase comparator 1301 generates a phase difference signal which indicates the phase difference.

The loop filter 1302 receives the phase difference signal from the phase comparator 1301, and filters the phase difference signal. For example, a low-pass filter is used for the loop filter 1302, and shuts off unnecessary high frequency, to prevent unnecessary oscillation which is caused by feedback of high frequency.

The VCO 1303 receives the filtered phase difference signal from the loop filter 1302, and generates a synchronized clock signal by changing the frequency based on the filtered phase difference signal.

The frequency multiplication/division unit 1304 receives the synchronized clock signal from the VCO 1303, and multiplies or divides the clock signal. Then, the frequency multiplication/division unit 1304 transmits a generated new synchronized clock signal to the phase comparator 1301.

When the frequency of the clock signal which is indicated by the square wave signal that is input to the PLL 158 is the same as the frequency of the synchronized clock signal that is output from the PLL 158, the frequency multiplication/division unit 1304 is not necessarily provided.

The PLL 158 synchronizes frequencies by increase/decrease the frequency of the VCO 1303 in a direction of correcting the phase difference which is detected by the phase comparator 1301. Specifically, operating the PLL 158 means the state where the VCO 1303 controls the frequency based on the phase difference from the clock signal indicated by the square wave signal that is input to the phase comparator 1301, and stopping the PLL 158 means the state where the VCO 1303 does not control the frequency regardless of the input clock signal. Therefore, even when the PLL 158 is stopped, the VCO 1303 continues to operate and output the synchronized clock signal. In other words, the PLL 158 can be operated or stopped, by operating or stopping the phase comparator 1301. In addition, the PLL 158 can be operated and stopped, respectively, by inputting and not inputting the clock signal which is input to the PLL 158 to the phase comparator 1301.

As explained above with reference to FIG. 10, suppose that the period in the fixed data item in which the PLL 158 is operated is set to be n times as long as the OFDM symbol, to separate unnecessary frequency components from the desired frequency by the frequency which is calculated by a reciprocal of the OFDM symbol length.

In this case, in the loop filter 1302 of the PLL 158, the cutoff frequencies may be set to frequencies which are less than or equal to the frequency which is calculated by a reciprocal of the OFDM symbol length. In addition, the frequency characteristic of the loop filter 1302 may be set to have particularly large attenuation quantity around frequency which is n times as large as the frequency that is calculated by a reciprocal of the OFDM symbol length. By such setting, unnecessary frequency components can be further reduced. As another example, the signal which is input to the PLL 158 may be filtered. For example, in the example in which a signal which has an OFDM symbol length of 4 µs is input as illustrated in FIG. 10, a BPF which has a pass band around 5 MHz is inserted before the phase comparator 1301, thereby unnecessary frequency components can be removed, and frequency synchronization accuracy can be enhanced. In this example, the frequency which is cut off by the BPF is desirably higher than a value which is smaller than the desired frequency by a frequency that is calculated by a reciprocal of the OFDM symbol length on the lower band side, and lower than a value which is larger than the desired frequency by the frequency which is calculated by a reciprocal of the OFDM symbol length on the higher band side.

Specifically, in the example of FIG. 10, since the reciprocal of the OFDM symbol length is 0.25 MHz, the frequency which is cut off by the BPF should be set to be larger than frequency 4.75 MHz on the lower side, which is smaller than the desired frequency 5 MHz by 0.25 MHz, and smaller than the frequency 5.25 MHz on the higher side, which is larger than the desired frequency 5 MHz by 0.25 MHz. Specifically, in the example of FIG. 10, a BPF which cuts off frequencies from 4.75 to 5.25 MHz should be used. As described above, the filter is provided with frequency characteristics such that the attenuation quantity increases at frequencies which are shifted from the desired frequency by n times as large as the frequency that is calculated by the reciprocal of the OFDM symbol length, and thereby it is possible to more effectively reduce unnecessary frequency components, and synchronize the frequencies with higher accuracy.

(First Modification of PLL)

Next, a first modification of the PLL 158 will be explained in detail with reference to FIG. 14.

Figure 14:
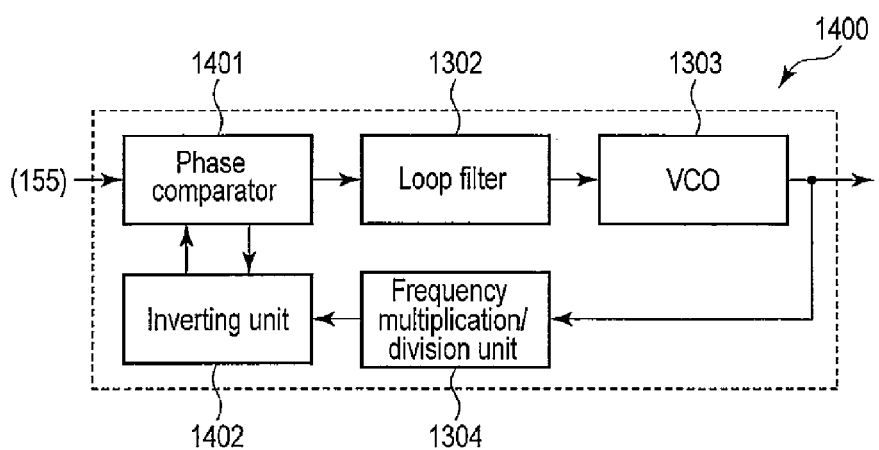
FIG. 14 is a block diagram illustrating a first modification of the PLL.

A PLL 1400 illustrated in FIG. 14 includes a phase comparator 1401, a loop filter 1302, a VCO 1303, a frequency multiplication/division 1304, and an inverting unit 1402. The loop filter 1302, the VCO 1303, and the frequency multiplication/division unit 1304 perform the same operations as those in the PLL 158 illustrated in FIG. 13, and explanation thereof here is omitted.

The phase comparator 1401 performs almost the same operation as that of the phase comparator 1301 illustrated in FIG. 13, but is different from the phase comparator 1301 in that the phase comparator 1401 receives a clock signal obtained by the square wave signal from the comparator 155, receives a synchronized clock signal from the inverting unit 1402 explained later, and generates an inversion control signal when a phase difference between the clock signals falls within a range of a threshold from 180°.

The inverting unit 1402 receives the synchronized clock signal from the frequency multiplication/division unit 1304, receives the inversion control signal from the phase comparator 1401, and inverts the phase of the synchronized clock signal. Therefore, the PLL 1400 can perform correction even when the phase of the input clock signal is shifted by 180°, and thus continue synchronization of the frequency and the phase.

As described above, to perform frequency synchronization by using a plurality of OFDM packets, it is desirable to select fixed data item such that the cycle T_ENV at which the envelope increases and decrases is 1/n as long as T_S, T_C, and T_I. In the case of using the PLL 1400, however, the inverting unit 1402 can perform correction even when the phase is shifted by 180° between OFDM packets, and thus it suffices that the T_ENV is 1/n as long as T_S, T_C, and 2×T_I. For example, when the PLL 158 illustrated in FIG. 12 is used in the example of IEEE 802.11a, T_ENV is 1/n of T_S (3.2 µs), T_C (0.8 µs), and T_I (1 µs), that is, T_ENV can be 0.2 or 0.1 µs. In the case of using the PLL 158 illustrated in FIG. 14, the T_ENV is 1/n as long as T_S (3.2 µs), T_C (0.8 µs), and 2×T_I (2 µs), that is, T_ENV can be 0.2, 0.1, and 0.4 µs. Thereby, it is possible to increase choices of the frequency used for synchronization.

(Second Modification of PLL)

A second modification of the PLL 158 will be explained in detail with reference to FIG. 15.

A PLL 1500 illustrated in FIG. 15 includes a loop filter 1302, a VCO 1303, a phase comparator 1501, and a frequency divider 1502. The loop filter 1302 and the VCO 1303 perform the same operations as those in the PLL 158 illustrated in FIG. 13, and explanation thereof are omitted.

The phase comparator 1501 perform almost the same operation as the phase comparator 1301, but is different from the phase comparator 1301 in that the phase comparator 1501 generates a control signal when a phase difference which falls within a threshold range from the phase difference of $360°÷K×k$ (each of K and k is an any integer) is detected.

The frequency divider 1502 receives the synchronized clock signal from the VCO 1303, and performs K/1 division. In addition, when the frequency divider 1502 receives a control signal from the phase comparator 1301, the frequency divider skips the input synchronized clock signal by k clocks, and thereafter restarts division. Therefore, since the PLL 1500 can correct the phase difference with a resolution of $360°÷K$, it suffices that T_ENV is 1/n as long as T_S, T_C, and K×T_I, and choices of the frequency can be further increased.

According to the first embodiment described above, the fixed data item is selected in the transmitter to be 1/n as long as the OFDM symbol length, the cyclic prefix length, and the OFDM packet transmission intervals, and the packet is detected in the receiver and a clock signal is extracted in the fixed data part excluding the head part and the end part of the packet. Thereby, frequency synchronization can be performed with high accuracy, without a transmitter which has high accuracy in the receiver.

(Second Embodiment)

A magnetic resonance imaging (MRI) apparatus according to a second embodiment will be explained hereinafter with reference to FIG. 16.

A wireless transceiver system 100 according to the second embodiment is the same as the wireless transceiver system 100 according to the first embodiment. The MRI apparatus 1600 includes an echo receiving coil 1601, a digital converter 1602, an echo transmitter 1603, antennas 1604 and 1605, an echo receiver 1606, and an MRI analyzer 1607.

Operation of the wireless transceiver system 100 is the same as that of the first embodiment, and explanation thereof is omitted herein.

The echo receiving coil 1601 receives a magnetic resonance signal which is radiated from a test object (not shown) as electromagnetic waves, and receives an echo signal which corresponds to the magnetic resonance signal.

The digital converter 1602 receives a synchronized clock signal from a PLL 158, receives the echo signal from the echo receiving coil 1601, and converts the echo signal into a digital echo signal based on the synchronized clock signal.

The echo transmitter 1603 receives the digital echo signal from the digital converter 1602, modulate the digital echo signal to transmit the digital echo signal in a wireless manner, and transmit the modulated digital echo signal to the antenna 1604.

The antenna 1604 receives the modulated digital echo signal from the echo transmitter 1603, and transmits the modulated digital echo signal in a wireless manner.

The antenna 1605 receives the modulated digital echo signal.

The echo receiver 1606 receives the modulated digital echo signal from the antenna 1605, and demodulates the modulated digital echo signal.

The MRI analyzer 1607 receives a clock signal from a clock generator 102, receives the digital echo signal from the echo receiver, analyzes the received digital echo signal based on the clock signal, and thereby generates an MRI image.

According to the second embodiment described above, the clock signal which is used in the MRI analyzer can be synchronized with the frequency of the clock signal which is used in the digital converter with high accuracy, and it is possible to improve the image quality of the MRI image generated by the MRI analyzer.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A wireless transceiver system comprising a transmitter and a receiver,
the transmitter comprising:
a first generator configured to generate a clock signal;
a second generator configured to generate a fixed data item that has bit values corresponding to the clock signal; and
a third generator configured to perform orthogonal frequency division multiplexing (OFDM) modulation for the fixed data item to generate an OFDM packet,
the receiver comprising:
a first detector configured to detect an envelope that indicates amplitude in a time waveform of the OFDM packet to obtain an envelope signal;
a comparator configured to compare the envelope signal with a first threshold to generate a square wave signal;
a second detector configured to detect a head part of the OFDM packet;
a phase-locked loop (PLL) configured to extract a synchronized clock signal from a main frequency component of the square wave signal, the synchronized clock signal being a signal synchronized with the clock signal; and
a controller configured to stop the PLL during a head period, and to operate the PLL for at least part of a time from a first time point when the head period is elapsed to a second time point when a first period is elapsed, the first period being a period that receiving of at least one OFDM packet has finished.

2. The system according to claim 1, wherein the controller controls to operate the PLL from a third time point to a fourth time point, the third time point being a time point when a second period is elapsed since the head period is elapsed, the fourth time point being a time point when a third period in which the OFDM packet is continuously received is finished.

3. The system according to claim 1, wherein the second generator generates the fixed data item which has bit values, by which the amplitude in the time waveform of the OFDM packet increases and decreases at a cycle, the cycle serving as a common divisor of a fourth period which indicates a cyclic prefix length, a fifth period which indicates an OFDM symbol length, and a sixth period which indicates transmission intervals of the OFDM packet, an OFDM symbol being included in the OFDM packet, and
the controller controls to operate the PLL only during a seventh period which indicates n times as long as the OFDM symbol length, n being an integer.

4. The system according to claim 3, wherein the PLL comprises a filter which has a cutoff frequency that is not more than a frequency calculated from a reciprocal of the OFDM symbol length.

5. The system according to claim 1, wherein the second detector detects the head part of the OFDM packet if a signal power of the envelope signal is not less than a second threshold.

6. A wireless transceiver method comprising:
generating a clock signal;

generating a fixed data item that has bit values corresponding to the clock signal;
performing orthogonal frequency division multiplexing (OFDM) modulation for the fixed data item to generate an OFDM packet;
detecting an envelope that indicates amplitude in a time waveform of the OFDM packet to obtain an envelope signal;
comparing the envelope signal with a first threshold to generate a square wave signal;
detecting a head part of the OFDM packet;
extracting a synchronized clock signal from a main frequency component of the square wave signal, the synchronized clock signal being a signal synchronized with the clock signal; and
controlling to stop a PLL during a head period and to operate the PLL for at least part of a time from a first time point when the head period is elapsed to a second time point when a first period is elapsed, the first period being a period that receiving of at least one OFDM packet has finished.

7. The method according to claim 6, wherein the controlling to operate the PLL controls to operate the PLL from a third time point to a fourth time point, the third time point being a time point when a second period is elapsed since the head period is elapsed, the fourth time point being a time point when a third period in which the OFDM packet is continuously received is finished.

8. The method according to claim 6, wherein the generating the fixed data item generates the fixed data item which has bit values, by which the amplitude in the time waveform of the OFDM packet increases and decreases at a cycle, the cycle serving as a common divisor of a fourth period which indicates a cyclic prefix length, a fifth period which indicates an OFDM symbol length, and a sixth period which indicates transmission intervals of the OFDM packet, an OFDM symbol being included in the OFDM packet, and
the controlling to operate the PLL controls to operate the PLL only during a seventh period which indicates n times as long as the OFDM symbol length, n being an integer.

9. The method according to claim 8, wherein the PLL comprises a filter which has a cutoff frequency that is not more than a frequency calculated from a reciprocal of the OFDM symbol length.

10. The method according to claim 6, wherein the detecting the head part detects the head part of the OFDM packet if a signal power of the envelope signal is not less than a second threshold.

11. A non-transitory computer readable medium including computer executable instructions, wherein the instructions, when executed by a processor, cause the processor to perform operations comprising:
generating a clock signal;
generating a fixed data item that has bit values corresponding to the clock signal;
performing orthogonal frequency division multiplexing (OFDM) modulation for the fixed data item to generate an OFDM packet,
detecting an envelope that indicates amplitude in a time waveform of the OFDM packet to obtain an envelope signal;
comparing the envelope signal with a first threshold to generate a square wave signal;
detecting a head part of the OFDM packet;
extracting a synchronized clock signal from a main frequency component of the square wave signal, the synchronized clock signal being a signal synchronized with the clock signal; and
controlling to stop a PLL during a head period and to operate the PLL for at least part of a time from a first time point when the head period is elapsed to a second time point when a first period is elapsed, the first period being a period that receiving of at least one OFDM packet has finished.

12. The computer readable medium according to claim 11, wherein the controlling to operate the PLL controls to operate the PLL from a third time point to a fourth time point, the third time point being a time point when a second period is elapsed since the head period is elapsed, the fourth time point being a time point when a third period in which the OFDM packet is continuously received is finished.

13. The computer readable medium according to claim 11, wherein the generating the fixed data item generates the fixed data item which has bit values, by which the amplitude in the time waveform of the OFDM packet increases and decreases at a cycle, the cycle serving as a common divisor of a fourth period which indicates a cyclic prefix length, a fifth period which indicates an OFDM symbol length, and a sixth period which indicates transmission intervals of the OFDM packet, an OFDM symbol being included in the OFDM packet, and
the controlling to operate the PLL controls to operate the PLL only during a seventh period which indicates n times as long as the OFDM symbol length, n being an integer.

14. The computer readable medium according to claim 13, wherein the PLL comprises a filter which has a cutoff frequency that is not more than a frequency calculated from a reciprocal of the OFDM symbol length.

15. The computer readable medium according to claim 11, wherein the detecting the head part detects the head part of the OFDM packet if a signal power of the envelope signal is not less than a second threshold.

16. A magnetic resonance imaging (MRI) apparatus comprising the wireless transceiver system according to claim 1 and further comprising:
an echo receiving coil configured to receive an echo signal;
a digital converter configured to convert the echo signal into a digital echo signal, based on a synchronized clock signal extracted by the PLL;
an echo transmitter configured to transmit the digital echo signal;
an echo receiver configured to receive the transmitted digital echo signal; and
an analyzer configured to analyze the digital echo signal to generate an MRI image based on a clock signal generated by the first generator.

17. A magnetic resonance imaging (MRI) method comprising the steps in the wireless transceiver method according to claim 6 and further comprising:
receiving an echo signal;
converting the echo signal into a digital echo signal, based on an extracted synchronized clock signal;
transmitting the digital echo signal;
receiving the transmitted digital echo signal; and
analyzing the digital echo signal to generate an MRI image based on a generated clock signal.

18. A non-transitory computer readable medium including the computer executable instructions included on the non-transitory computer readable medium according to claim 11, and including further instructions, wherein the further instructions, when executed by a processor, cause the processor to perform further operations comprising:
   receiving an echo signal;
   converting the echo signal into a digital echo signal, based on an extracted synchronized clock signal;
   transmitting the digital echo signal;
   receiving the transmitted digital echo signal; and
   analyzing the digital echo signal to generate a magnetic resonance imaging (MRI) image based on a generated clock signal.

* * * * *